United States Patent [19]
Bouet et al.

[11] Patent Number: 5,284,601
[45] Date of Patent: Feb. 8, 1994

[54] ACTIVE MASS FOR AN ELECTRODE OF AN ELECTROCHEMICAL CELL, THE ACTIVE MASS HAVING A THREE-DIMENSIONAL POROUS SUPPORT

[75] Inventors: Jacques Bouet, Paris; Bernard Crochepierre, St Medard-en-Jalles; Bernadette Pichon, Velizy Villacoublay, all of France

[73] Assignee: SAFT, Romainville, France

[21] Appl. No.: 910,391

[22] Filed: Jul. 8, 1992

[30] Foreign Application Priority Data

Jul. 9, 1991 [FR] France .................. 91 08590

[51] Int. Cl.$^5$ ................... H01B 1/06; C25B 11/04; H01M 4/60
[52] U.S. Cl. ................... 252/518; 204/280; 204/284; 204/290 R; 429/212; 429/215; 429/223
[58] Field of Search ............ 204/280, 284, 290 R; 429/41, 218, 236, 42, 44, 45, 212, 215, 223; 252/218

[56] References Cited

U.S. PATENT DOCUMENTS

| | | | |
|---|---|---|---|
| 4,380,578 | 4/1983 | Baharg | 429/212 |
| 4,906,539 | 3/1990 | Terasaka et al. | 429/217 |

FOREIGN PATENT DOCUMENTS

| | | |
|---|---|---|
| 0301647 | 2/1989 | European Pat. Off. |
| 2184012 | 12/1973 | France |
| 2104717 | 3/1983 | United Kingdom |

*Primary Examiner*—Kathryn Gorgos
*Attorney, Agent, or Firm*—Sughrue, Mion, Zinn, Macpeak & Seas

[57] ABSTRACT

A paste for impregnating a three-dimensional metal sponge porous support, which impregnated porous support is dried to provide an electrode for an electrochemical cell. The paste comprises (i) an electrochemically active material selected from a metal hydride and a metal hydroxide in an amount of from 40% to 60% of the weight of the paste, and (ii) a gel containing xanthan in an amount of from 0.5% to 2% of the weight of the gel. The paste has a yield point greater than the shear stress due to the gravity so that the paste does not flow out of the impregnated support. Also disclosed is a method of making an electrochemical cell electrode, comprising the steps of preparing the above-described paste, impregnating the paste into a three-dimensional metal sponge porous support, and drying the paste. The inventive paste is advantageously retained in the support during the drying step.

3 Claims, 1 Drawing Sheet

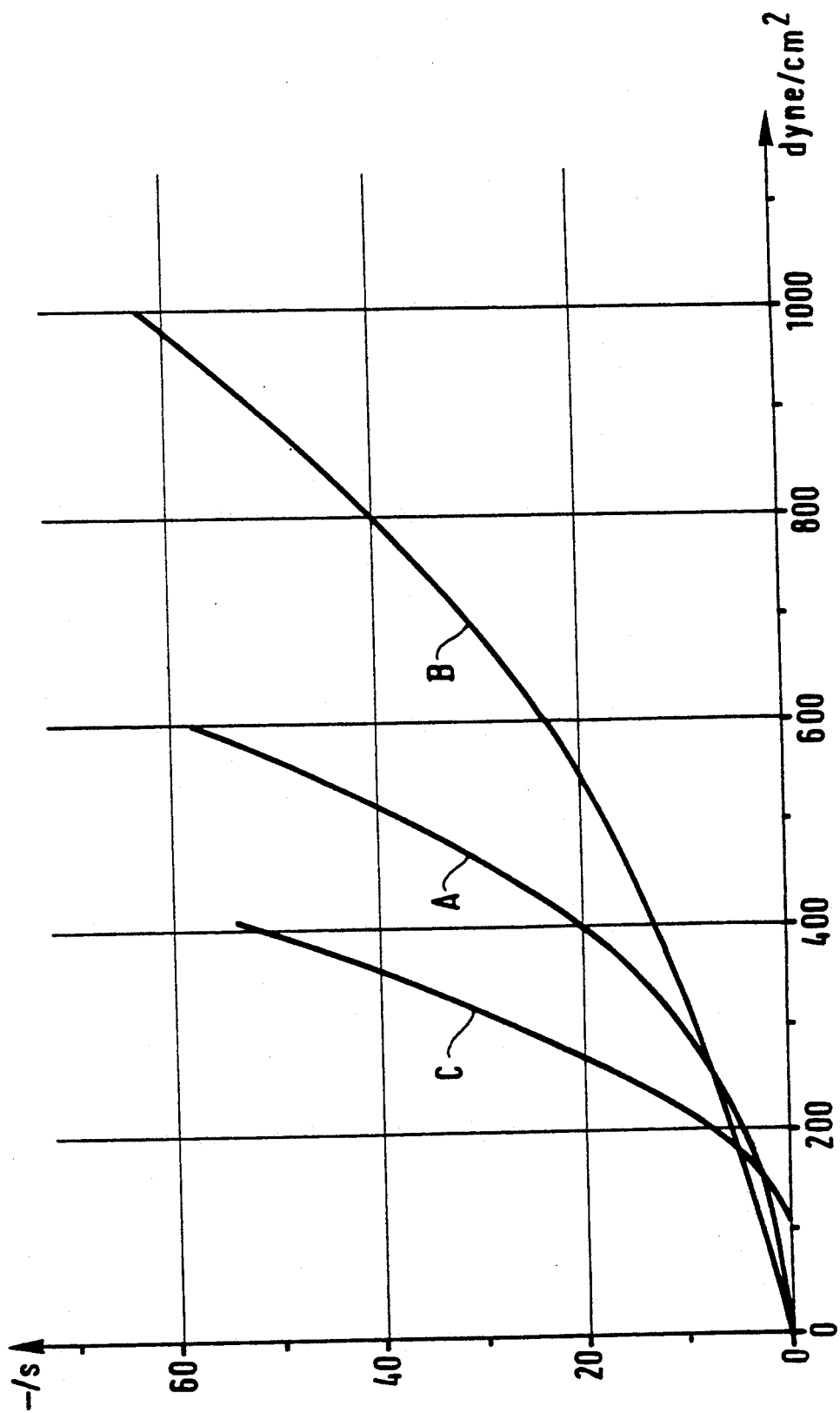

ACTIVE MASS FOR AN ELECTRODE OF AN ELECTROCHEMICAL CELL, THE ACTIVE MASS HAVING A THREE-DIMENSIONAL POROUS SUPPORT

The present invention relates to an active mass for an electrode of an electrochemical cell, the active mass having a three-dimensional porous support, e.g. of the sponge type. In particular, the active mass may be used in manufacturing electrodes based on active material having high relative density (up to 7-9), especially metal hydride negative electrodes and nickel hydroxide positive electrodes.

BACKGROUND OF THE INVENTION

Such electrodes can be made by impregnating a three-dimensional porous support with an active mass in the form of a paste made by the active material proper being fed into a gel based on a hydroxycolloid such as carboxy methyl cellulose (CMC) or hydroxy propyl methyl cellulose (HPMC). By coating the support and drying the paste, it is possible to obtain a finished electrode structure which can used directly in a cell. The advantage of that type of method lies in the fact that a three-dimensional porous support can be impregnated in a single step, whereas in the prior method of filling a conventional sintered nickel support, impregnation had to be performed in several successive steps in order to fill the support with the right amount of active mass.

However, the method recommended above suffers from implementation difficulties essentially related to the viscosity of the paste during the filling and drying steps. Although hydroxycolloids used up until now give the paste a viscosity well suited to filling, they do not enable the paste to be then held correctly in the support.

An aim of the present invention is to avoid this drawback, and to provide an active mass which is easier to use than known active masses.

SUMMARY OF THE INVENTION

The present invention provides an active mass for an electrode of an electrochemical cell, the active mass having a three-dimensional porous support, in particular of the metal sponge type, and being in the form of a paste constituted by an active material of the metal hydride or hydroxide type fed into a gel based on a hydroxycolloid, wherein said hydroxycolloid is xanthan, and the concentration thereof in said gel lies in the range 0.5% to 2% by weight, the concentration of active material in said paste lying in the range 40% to 60% by weight.

Xanthan is a heteropolysaccharide constituted by a main chain of glucose $\beta D$ structural units with branches of glucuronic acid and mannose structural units.

Surprisingly, despite the high concentration of active material in the paste, the paste has the rheological properties of a "rheofluidizing" fluid with a plasticity threshold. It would have been reasonable to expect the active material to have settled out.

At rest, the paste of the invention has internal forces (polar forces, Van der Waals forces) which give it infinite viscosity, i.e. which make it act like a solid. But if a shear stress exceeding the stresses corresponding to said internal forces is applied the paste, it becomes fluid. Under such conditions, it is easy to make the paste penetrate into its support. Once the support has been filled with paste, the paste does not run and remains held inside the support, because its yield point is greater than the shear stress due to gravity.

Very advantageous rheological properties are obtained even with very low quantities of xanthan, e.g. lying in the range 0.5% to 1% by weight of gel. Previously, in order to obtain pastes having viscosity as high as that, much larger concentrations of CMC or HPMC were necessary. By using xanthan, the proportion of carbonates resulting from degradation of the hydroxycolloid during electrochemical operation of the electrode is considerably reduced. This is a major advantage offered by the present invention, because a high level of carbonate is detrimental to electrochemical operation of the cell.

In a variant embodiment, the gel further includes carob in a concentration lying in the range 0.25% to 0.5% when the quantity of xanthan lies in the range 0.5% to 1%.

Other characteristics and advantages of the present invention will appear on reading the following description of embodiments given by way of non-limiting example.

BRIEF DESCRIPTION OF THE DRAWING

For two prior art pastes, and the paste of the invention, the sole FIGURE shows shear tension (in dynes/cm$^2$) as a function of shear speed (arbitrary units/second).

DETAILED DESCRIPTION

Three pastes A, B, & C were prepared, each containing (by weight) 60% nickel hydroxide and 40% 1%-hydroxycolloid gel.

Paste A: the hydroxycolloid was carboxy methyl cellulose.

Paste B: the hydroxycolloid was hydroxy propyl methyl cellulose.

Paste C of the invention: the hydroxycolloid was xanthan.

The curves A, B, C in the sole FIGURE show the comparative characteristics of the three pastes.

The xanthan paste shows a yield point of the order of 125 dynes/cm$^2$ whereas the viscosities of pastes A and B drop as soon as any shear stress is applied.

The shear stress due to gravity of the paste C fed into in a sponge having a thickness of 1.5 Mm and a mean pore diameter of about 300 micrometers is of the order of 13.5 dynes/cm$^2$. Since the yield point of the paste is greater than the gravity shear stress, the paste does not flow out when it is drying. (All the preceding values are given for ambient temperature).

If the xanthan content is reduced to 0.5%, the yield point is 21.35 dynes/cm$^2$, which is still greater than the gravity shear stress.

If 0.5% of the xanthan in the paste C of the invention is replaced by 0.5% carob, the yield point rises from 125 dynes/cm$^2$ to 175 dynes/cm$^2$. The carob content may vary in the range 0.25% to 0.5% by weight of gel, but the paste of the invention must always contain at least 0.5% xanthan in order to offer advantageous rheological properties.

In another embodiment, a paste is made containing 50% by weight of a hydridable metal alloy in powder form having grain size of the order of 40 micrometers. The powder is fed into a gel containing water and 1% xanthan. The resulting paste is fed into the above-mentioned metal sponge by shearing and is then dried in an inert atmosphere at 40° C. to remove the water. During drying, it can be observed that the rheological quality of the paste is such that it does not flow out of its support.

By compressing the impregnated support until its thickness is reduced to 0.3 mm, an electrode is obtained having capacity per unit mass of 300 mAh/g and capacity per unit volume of 1.7 Ah/cm$^3$.

Naturally, the invention is not limited to the above-described embodiments.

We claim:

1. A paste for impregnating a three-dimensional metal sponge porous support, which impregnated porous support is dried to provide an electrode for an electrochemical cell, said paste comprising (i) an electrochemically active material selected from the group consisting of a metal hydride and a metal hydroxide in an amount of from 40% to 60% of the weight of the paste, and (ii) a gel containing xanthan in an amount of from 0.5% to 2% of the weight of the gel, said paste having a yield point greater than the shear stress due to gravity so that the paste does not flow out of the impregnated support.

2. The paste of claim 1, wherein the gel contains xanthan in an amount of from 0.5 to 1% of the weight of the gel.

3. The paste of claim 1, wherein the gel further comprises carob in an amount of from 0.25 to 0.5% of the weight of the gel.

* * * * *